United States Patent [19]
Moline et al.

[11] 3,863,520
[45] Feb. 4, 1975

[54] LIMIT MECHANISM FOR MANUAL SHIFT CONTROL LEVER

[75] Inventors: Kenneth R. Moline, Peoria; Maurice F. Franz, East Peoria; Philip S. Webber, Morton, all of Ill.

[73] Assignee: Caterpillar Tractor Co., Peoria, Ill.

[22] Filed: June 13, 1973

[21] Appl. No.: 369,714

[52] U.S. Cl. .................. 74/475, 74/526, 74/534
[51] Int. Cl. ..................... G05g 5/02, G05g 9/08
[58] Field of Search ........... 74/473 R, 475, 526, 534

[56] References Cited
UNITED STATES PATENTS

| | | | |
|---|---|---|---|
| 3,180,174 | 4/1965 | Walter | 74/475 |
| 3,490,291 | 1/1970 | Fitzpatrick et al. | 74/473 |
| 3,520,208 | 7/1970 | Davis et al. | 74/473 R |
| 3,665,775 | 5/1972 | Freeman | 74/473 R |

*Primary Examiner*—Allan D. Herrmann
*Attorney, Agent, or Firm*—Phillips, Moore, Weissenberger, Lenpio & Strabala

[57] ABSTRACT

A manually operable shift control mechanism having a pivoted lever angularly movable to selectively establish one of a multiplicity of speed ratios in a transmission, a limit mechanism being operable to limit the number of consecutively arranged settings through which the control lever may be continuously moved. The invention also includes different embodiments of override means being selectively operable to permit substantially free angular movement of the lever through the consecutively arranged settings.

8 Claims, 8 Drawing Figures

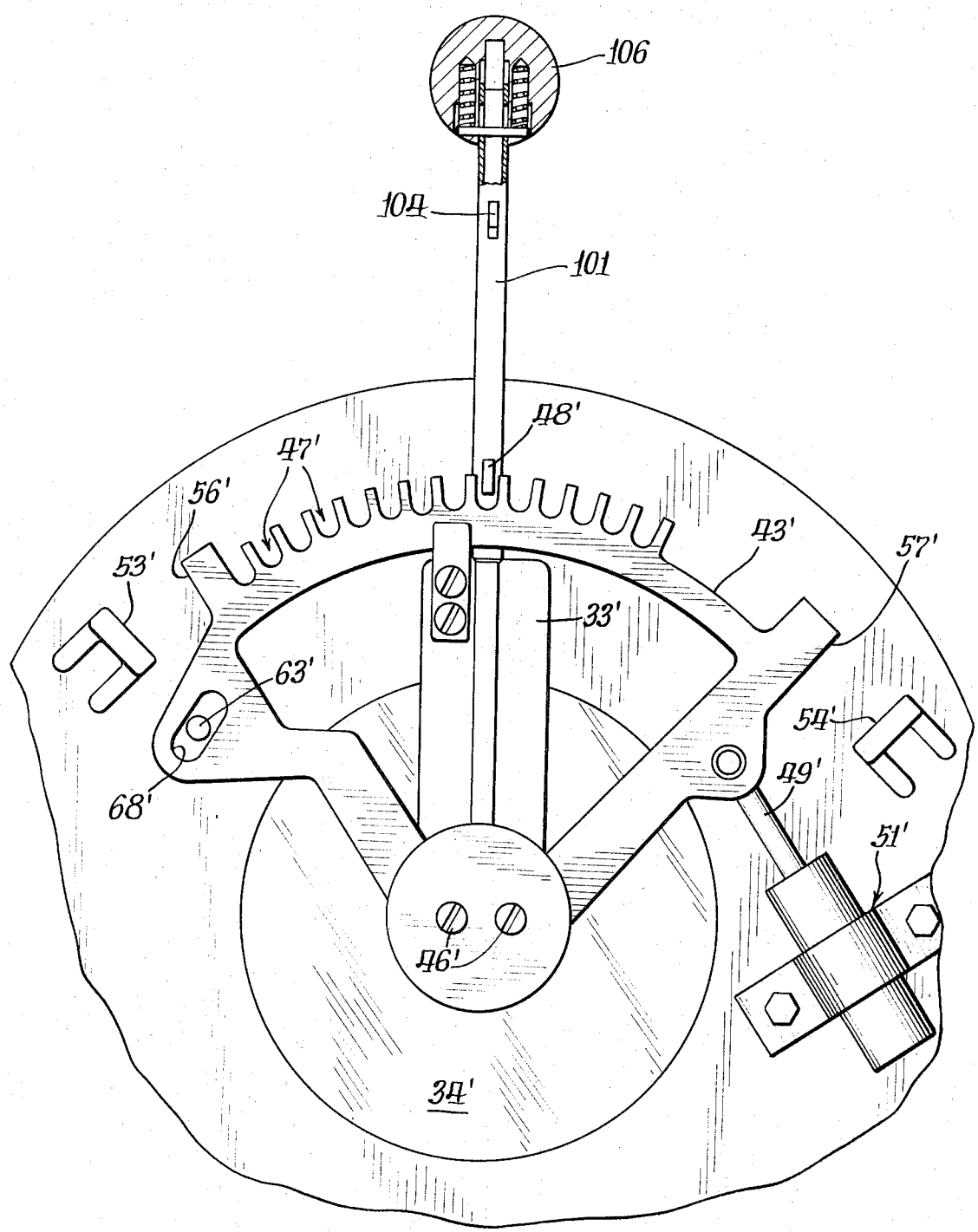

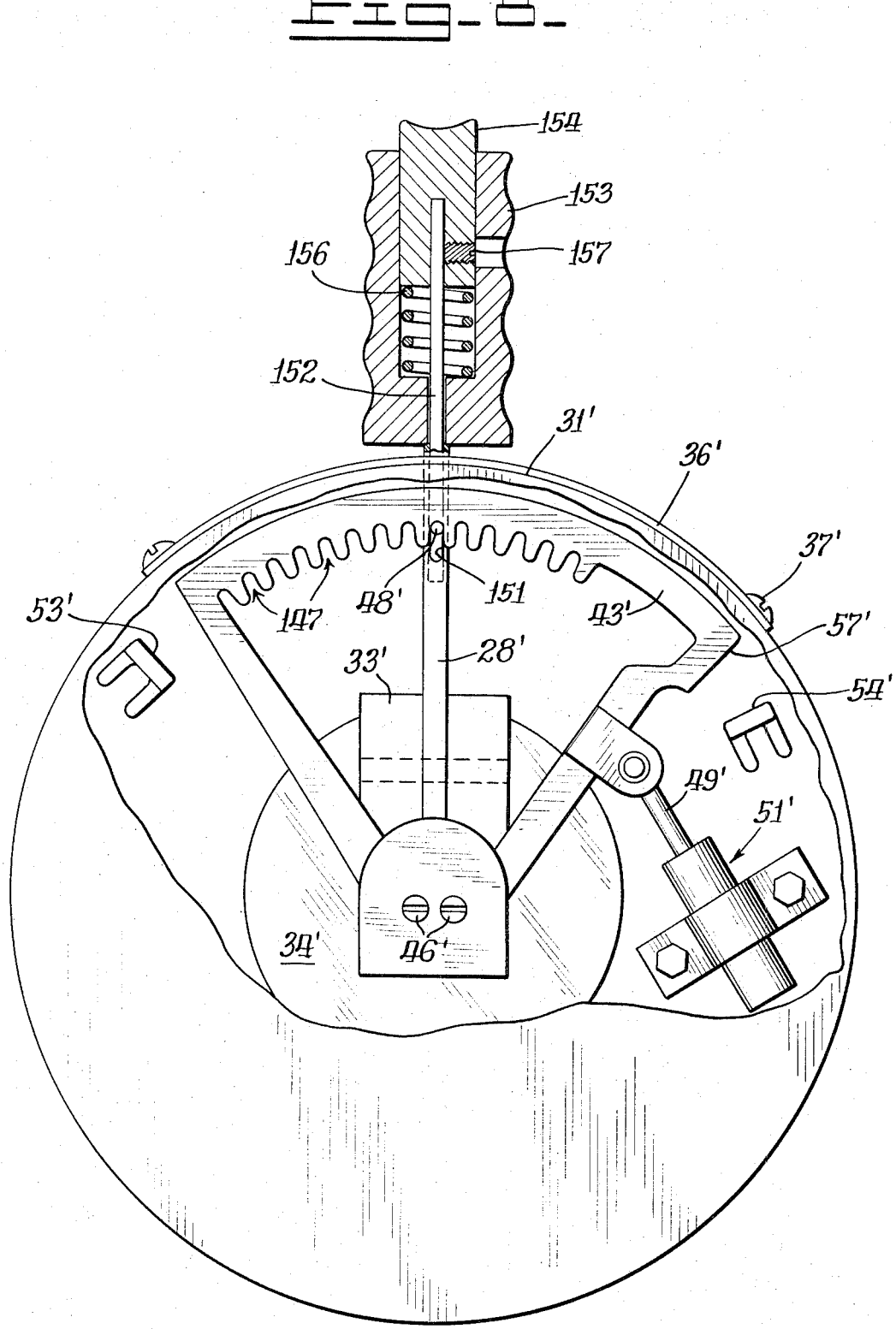

LIMIT MECHANISM FOR MANUAL SHIFT CONTROL LEVER

BACKGROUND OF THE INVENTION

The present invention relates to a manually operable shift control mechanism for a transmission and more particularly to a manual shift control mechanism for a transmission providing a multiplicity of possible speed ratios.

A transmission of the type contemplated for regulation by the shift control mechanism of the present invention is described, for example, in U.S. Pat. No. 3,667,309 dated June 6,1972 and assigned to the assignee of the present invention. The transmission of that patent is adaptable for use in vehicles, particularly large earthmoving or material handling vehicles. Accordingly, a large number of possible speed ratios are provided to assure proper operation under various conditions. The transmission may be regulated by a control valve arrangement which, in turn, is operable by a manual shift control mechanism of the type provided by the present invention.

In vehicles of the type described above, damage may occur in the transmission or other portions of the vehicle because of inadvertent or inexperienced operation where an excessive change in speed ratio is attempted during a single shift. It has been found that under normal operating conditions, particularly when the vehicle is in motion, the possibility of damage to the vehicle and to its transmission may be minimized by limiting the relative change of speed ratio during any given speed ratio shift. However, under certain circumstances, such as start-up, for example, it may be desirable to permit the operator to freely select and establish any given speed ratio within the transmission.

SUMMARY OF THE INVENTION

Accordingly, it is an object of the present invention to provide a manually operable shift control mechanism with limit means for limiting the number of consecutively arranged settings through which a shift control lever in the mechanism may be continuously moved.

It is also an object of the present invention to provide such a manually operable shift control mechanism wherein the number of consecutively arranged settings through which the control lever is continuously movable may be adjusted, for example, depending upon the range of speed ratios instantly extablished within the transmission.

It is also an object of the present invention to provide override means being selectively operable to override the limit means and permit substantially free angular movement of the shift control lever through any number of speed ratio settings.

Additional objects and advantages of the present invention are mide apparent in the following description having reference to the accompanying drawings.

DESCRIPTION OF THE DRAWINGS

FIG. 7 is a veiw, with parts in section, of the embodiment of FIG. 6 as viewed, for example, from the right side of FIG. 6.

FIG. 8 is a view similar to FIG. 7 and illustrates still another embodiment of the present invention, particularly in connection with an override feature in the manual shift control mechanism.

DESCRIPTION OF THE PREFERRED EMBODIMENTS

Figure 1:
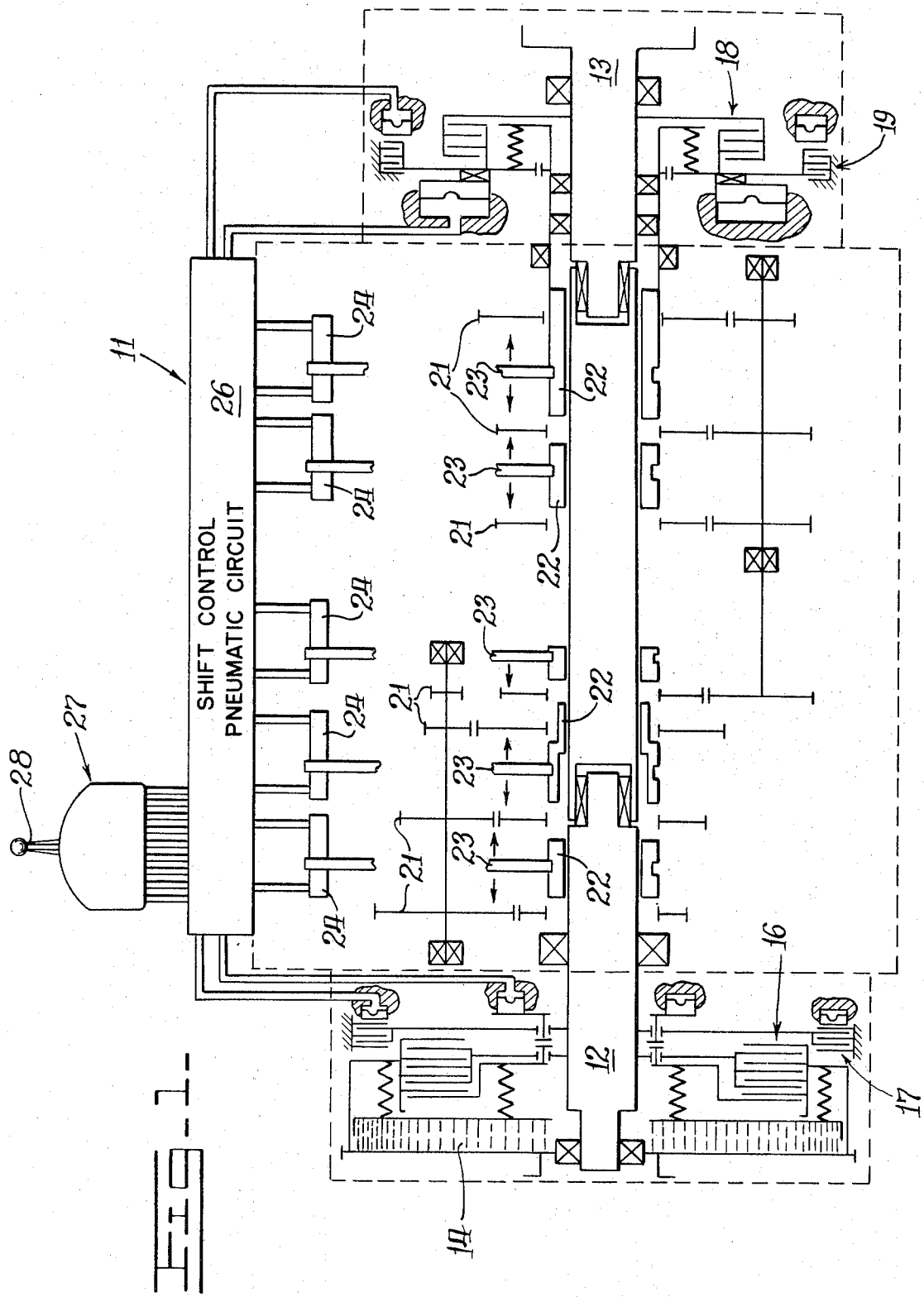
FIG. 1 is a generally schematic representation, with parts in section, of a vehicle transmission of a type suitable for regulation by the manual shift control mechanism of the present invention.

A transmission of the type with which the shift control mechanism of the present invention may be employed is schematically represented in FIG. 1. Referring to that figure, the transmission is generally indicated at 11 with an input shaft 12 and an output drive shaft 13. Rotation of the input shaft 12 relative to the flywheel 14 of an engine or prime mover (not shown) is regulated by an input clutch 16 and an input brake 17. Similarly, an output clutch 18 and an output brake 19 are associated with the output drive shaft 13. The manner in which these components cooperate with the transmission 11 to provide locomotive power for a vehicle are described in greater detail, for example, in U.S. Pat. No. 3,667,309 as noted above.

The transmission 11 includes a plurality of gear trains 21 which may be interconnected to form a variety of power paths through the transmission 11 by shifting clutch collars 22 in order to provide a relatively large number of speed ratios between the input shaft 12 and the output drive shaft 13. Each of the clutch collars 22 is positioned by an associated shift fork 23. The forks 23 are in turn positioned by respective fluid means or cylinders 24. The cylinders 24 are selectively actuated by fluid under pressure from a shift control valve arrangement as indicated at 26 to establish one of the multiplicity of speed ratios within the transmission 11. A fluid shift control valve arrangement of the type indicated at 26 is illustrated and described in greater detail, for example, in U.S. Pat. No. 3,667,309 dated June 6, 1972 and assigned to the assignee of the present invention.

A manual shift control mechanism toward which the present invention is directed is generally indicated at 27 and includes a manual shift control lever 28. The construction and manner of operation for the manual shift control mechanism 27 in selectively establishing one of a multiplicity of speed ratios in a transmission is described in greater detail below with particular reference to FIGS. 2–4.

Figure 2:
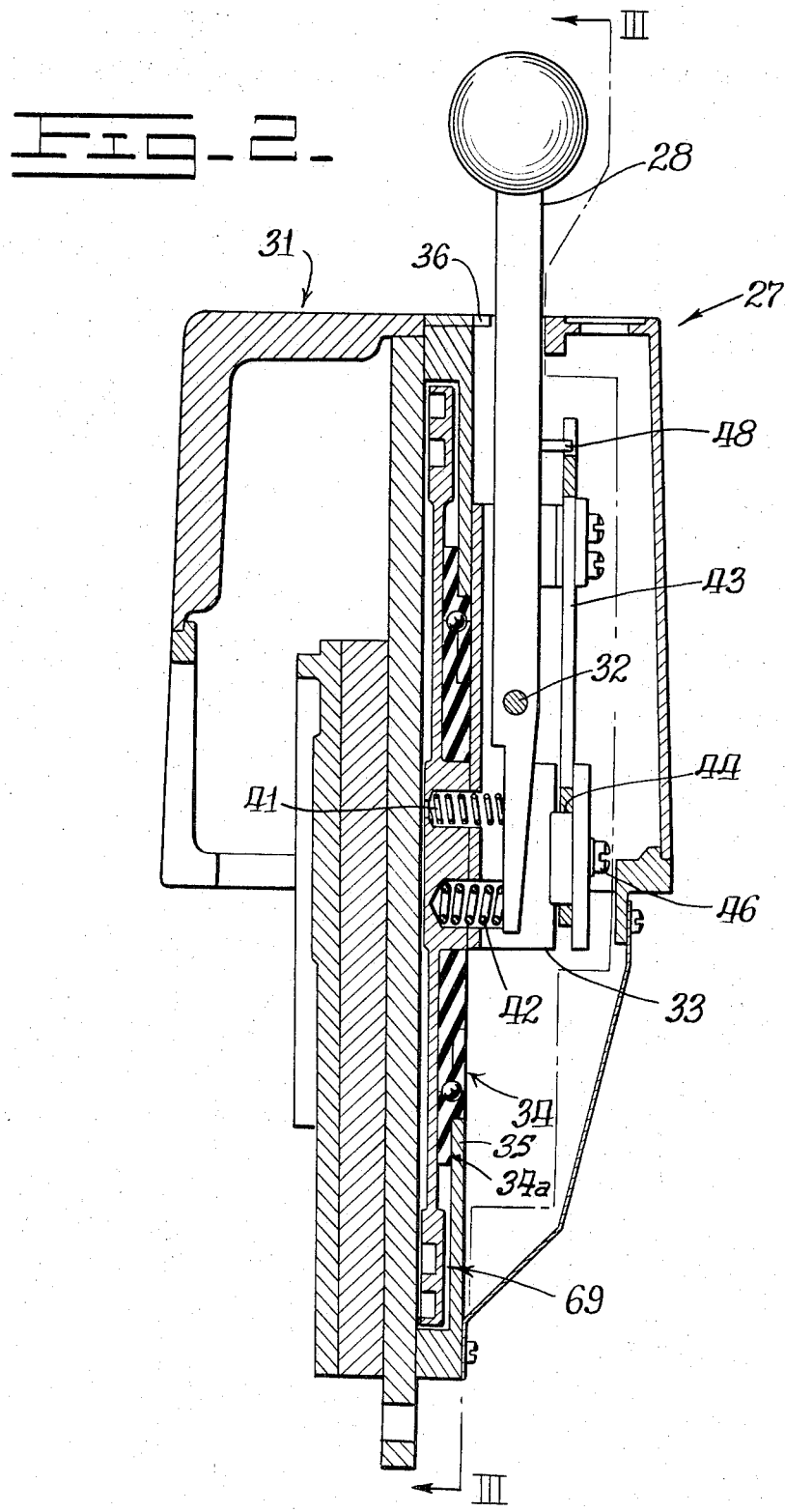
FIG. 2 is a centrally sectioned side view of a shift control mechanism constructed according to the present invention.

Referring particularly to FIG. 2, the manual shift control mechanism includes a fabricated housing 31.

The lever 28 is pivotably secured about a pin 32 to a support member or lever base 33. The lever base 33 together with the lever 28 is supported for pivotable or rotational movement relative to the housing 31 by means of a bearing assembly 34. The bearing assembly 34 provides a surface 34a which bears upon a plate 35 extending inwardly from the housing 31 in order to rotatably secure the lever base 33.

Figure 3:
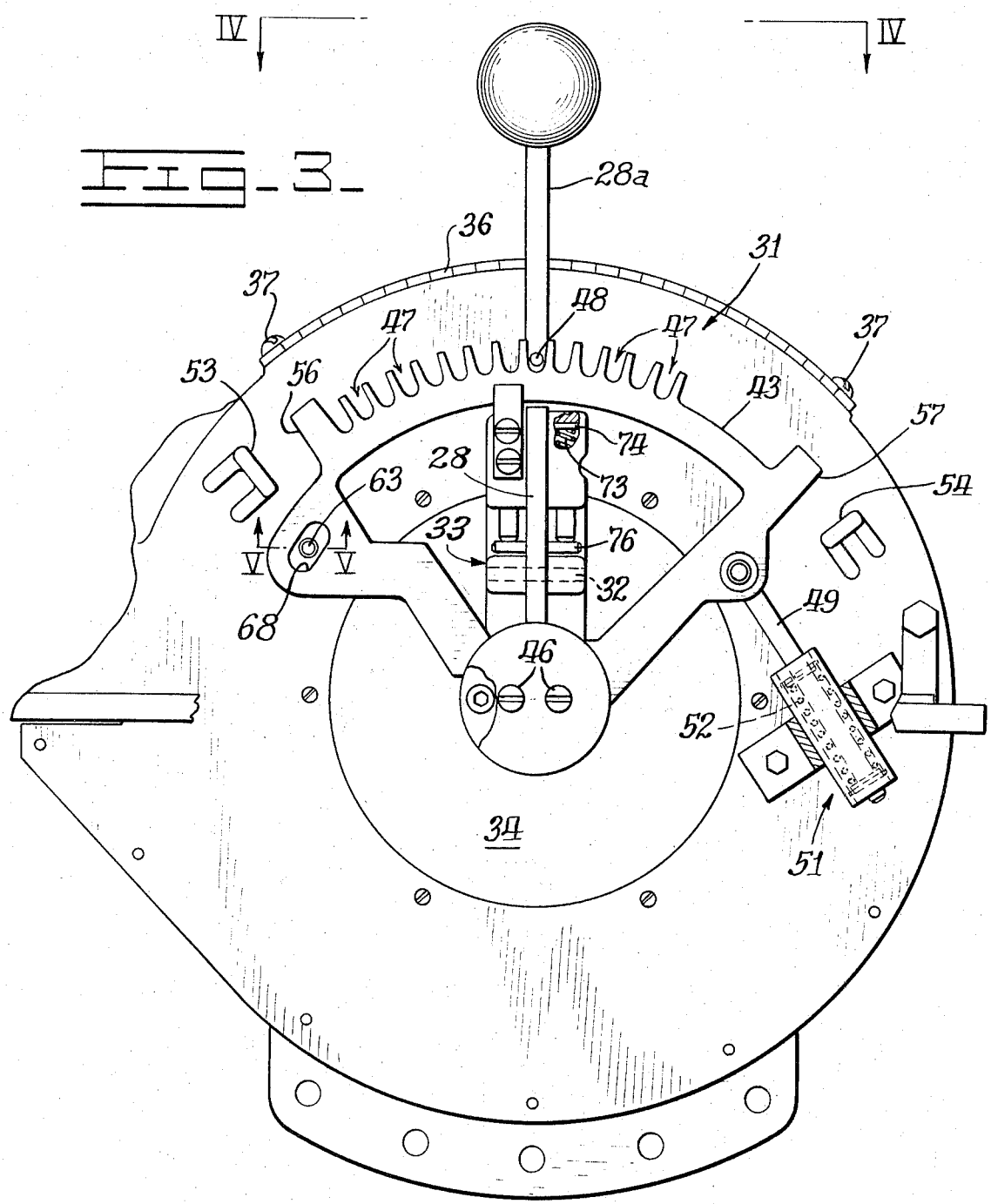
FIG. 3 is a view of the shift control mechanism of FIG. 2 taken along section line III—III. The control lever of FIG. 3 is modified to illustrate a preferred override feature.
Figure 4:
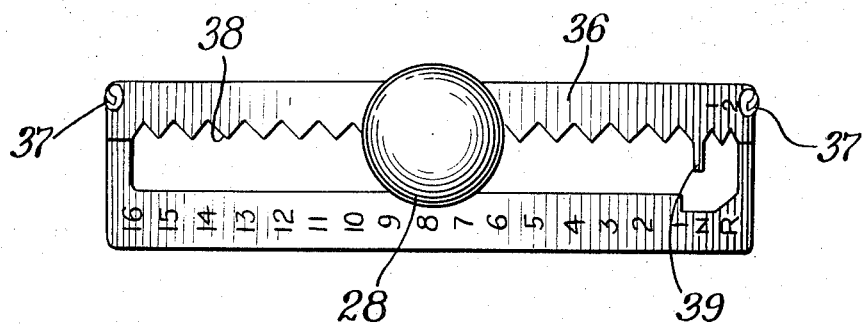
FIG. 4 is a fragmentary plan view of the shift control mechanism of FIG. 3 taken along section IV—IV.

Referring also to FIGS. 3 and 4, it may be seen that a gate member 36 is secured to the housing 31 by screws 37 and provides serrations 38 acting as stops for tending to hold the lever 28 in each of the speed ratios indicated by consecutively arranged numbers 1–16 (see FIG. 4) which represent forward gears, a neutral setting at N and first and second speed ratio settings in reverse. The gate 36 is also formed with a stop 39 in line with the neutral position N for the control lever 28 to prevent accidental shifting into a reverse gear as discussed in greater detail below.

Referring particularly to both of FIGS. 2 and 4, the control lever 28 is movable about an axis of rotation provided by the lever base 33 for movement between the consecutively arranged speed ratios indicated in FIG. 4. The control lever 28 is also pivotable about the pin 32 to either engage or release the lever 28 with respect to the serrations 38 and the stop 39. A first relatively light spring 41 tends to pivot the control lever 28 in a counterclockwise direction as viewed in FIG. 2 into engagement with the serrations 38 of FIG. 4. Thus, the spring 41 and serrations 38 comprise means for releasibly engaging the lever 28 in any of a multiplicity of settings. A heavier spring 42 cooperates with the spring 41 to provide increased resistance to clockwise rotation of the control lever 28 as necessary to clear the stop 39. Thus, the increased force provided by the spring 42 signals the operator when the control lever 28 is positioned for a possible shift into a reverse gear.

The construction of a limit mechanism within the shift control assembly of FIGS. 2–4 is described below for preventing an excessive change in the speed ratio setting during a single shift. It is to be noted that the limit mechanism of the present invention may be adapted to limit continuous movement of the lever 28, for example, to one or more consecutively arranged speed ratio settings, depending on the characteristics of the transmission and vehicle with which the control assembly is associated. Within the present embodiment, it is contemplated that movement of the control lever 28 during a single shift be limited to a maximum of two speed ratio settings at least between the consecutively arranged settings of 12th gear forward through 2nd gear forward.

Variable limit means are discussed below particularly with reference to FIG. 5 for further limiting the maximum motion of the control lever 28 in the higher gear ration 13–16.

Referring again to FIGS. 2–4, the limit mechanism of the present invention includes an inhibitor plate 43 which is pivotably mounted upon a retainer 44 secured to the lever base 33 by bolts 46. Accordingly, the inhibitor plate 43 is free for pivotable motion or rotation about the same axis as the control lever 28 together with its base 33.

Referring particularly to FIG. 3, the inhibitor plate 43 is formed with a plurality of indexing slots 47, each of the slots 47 being in radial alignment with one of the speed ratio settings and serrations 38 as best seen in Fig. 4. Referring particularly to FIG. 2, it may be seen that the gate 36 and the inhibitor plate 43 are arranged upon opposite sides of the control lever 28. The control lever 28 has a pin 48 which is of a suitable length so that it engages one of the indexing slots 47 whenever the control lever 28 is moved against the springs 41 and 42 to clear the serrations 38. Accordingly, the inhibitor plate 43 is engaged by and moved with the control lever 28 whenever the control lever 28 is shifted to a different speed ratio setting. The pivotable inhibitor plate 43 is coupled by means of a shaft 49 to a centering device 51 including a spring 52. Accordingly, the inhibitor plate 43 tends to return to a position where the indexing slots 47 are aligned with the serrations 38 when it is not engaged by the pin 48 on the control lever.

Stop members 53 and 54 are secured to the housing 31 in alignment with the inhibitor plate 43 and in circumferentially spaced apart relation from opposite end surfaces 56 and 57 of the inhibitor plate, in its centered position, correspond to two consecutive speed ratio settings (see FIG. 4). When the control lever 28 is pivoted out of engagement with any of the serrations 38, the pin 48 engages one of the indexing slots 47. Accordingly, the inhibitor plate 43 is pivoted along with the control lever 28 and limits its movement upon contacting one of the stops 53 and 54. When the operator again releases the control lever 28, it is engaged by the serrations 38 and the pin 48 is disengaged from the indexing slots 47. Accordingly, the inhibitor plate 43 returns to its resiliently centered position as illustrated in FIG. 3. It is thus conditioned to again limit movement of the control lever 28 when it is disengaged from the serrations 38.

Figure 5:
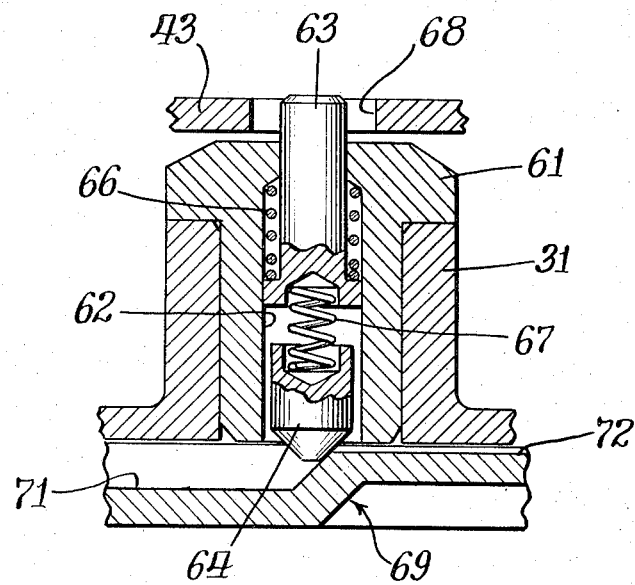
FIG. 5 is a fragmentary sectioned view of a variable limit means provided within the shift control mechanism by the present invention.

A variable or alternate limit means for further restricting movement of the control lever 28 is best seen by combined reference to FIGS. 3 and 5. A bushing 61 pressed into place upon the housing 31 provides a bore 62 within which are arranged a plunger 63 and a follower 64. The plunger 63 tends to be retracted within the bore 62 by means of a first spring 66. Another spring 67 is arranged between the plunger 63 and the follower 64 in the bore 62. Upon extension from bore 62, the plunger 63 engages an elongated slot 68 formed in the inhibitor plate 43 (see FIG. 3). The follower 64 tends to protrude from the opposite end of the bore 62.

Referring also to FIG. 2, a cam plate 69 is rotatable within the housing 31 together with the control lever 28 and its base 33. The cam plate 69 has a relativey recessed surface 71 which is in axial alignement with the follower 64 when the control lever 28 is positioned in any of the consecutive speed ratio settings between 12th gear forward and 2nd gear reverse. In those speed ratio settings, the follower 64 moves downwardly against the surface 71 so that the spring 66 is effective to retract the plunger 63 out of engaging alignment with the slot 68. Accordingly, within those speed ratio settings, maximum angular movement of the control lever 28 and the inhibitor plate 43 is limited only by the stops 53 and 54.

When the lever 28 is positioned in alignment with the speed ratio settings 13–16, a raised surface 72 on the cam plate 69 is aligned with the follower 64 and urges it upwardly into the bore 62 as viewed in FIG. 5. Under these circumstances, the plunger 63 is extended upwardly to the position illustrated in FIG. 5 for abutting engagement with the slot 68. The spaces formed on opposite sides of the plunger 63 by the slot 68 each correspond to approximately one speed ratio setting (see FIG. 4). Accordingly, within that higher speed ratio range, movement of the control lever 28 together with the inhibitor plate 43 is limited in generally the same manner as described above to a maximum of one speed ratio setting during each shift.

The override feature referred to above is not always necessary for operation of the limit mechanism as discussed above. However, it is sometimes desirable for an operator to be able to override the limit mechanism, for example, when a vehicle is brought to a stop with the control lever 28 in a relatively high speed ratio setting. Under those circumstances, it is desirable that the operator be able to immediately shift the control lever 28 into an appropriately low speed ratio setting. To provide such an override feature, the control lever 28 may be raised upwardly relative to the lever base 33 so that the pin 48 is raised out of engagement with the indexing slots 47. Upward movement an end portion 28a (See FIG. 3) of the control lever 28 is resisted by a pair of springs 73 acting in compression between pins 74 secured to the main lever 28 and pins 76 secured to the lever extension 28a thus, the operator may, by conscious effort, raise the control lever 28 to override the limit mechanism provided by the inhibitor plate 43. However, when the control lever 28 is not forced upwardly against springs 73, it tends to remain in the position shown in FIG. 3 with the pin being engageable with the indexing slots 47.

Figure 6:
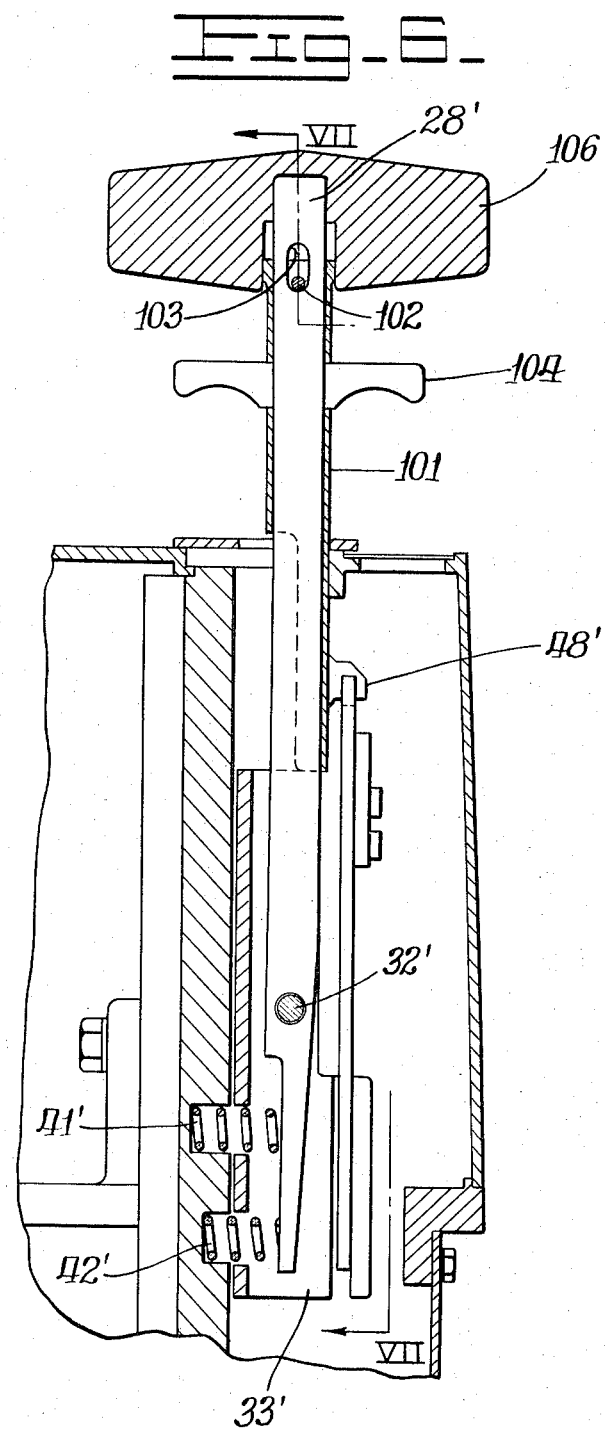
FIG. 6 is a sectioned view generally similar to FIG. 2 while illustrating an alternate embodiment, particularly in connection with an override feature of the present invention.

An alternate override mechanism is illustrated in FIGS. 6 and 7. Many features of the manual shift control mechanism are the same as described above with reference to FIGS. 2-5. Accordingly, similar components in the embodiment of FIGS. 6 and 7 are indicated by primed numerals corresponding to numerals identifying those components in FIGS. 2-5. The major change in FIGS. 6 and 7 is that the control lever 28' is not extendible relative to the lever base 33'. Rather, the lever 28' is provided with a tubular actuator portion 101 upon which the lug 48' is mounted (see FIG. 7). Another pin 102 extends from the lever 28' to engage a slot 103 in the actuator element 101. The length of the slot 103 limits movement of the actuator element and its engagement with the pin 102 retains alignment of the lug 48' with the indexing slots 47'. A T-shaped handle 104 is secured to the tubular actuator element 101 below a handle 106 which is secured to the control lever 28' itself. Thus, an operator may initiate the override function merely by raising the handle 104 and moving the lug 48' out of engaging alignment with the indexing slot 47'.

Another override design is also illustrated in FIG. 8. Since most features of the manual shift control mechanism of FIG. 8 also correspond to those in FIGS. 2-5, corresponding features are again indicated by primed numerals. The lever 28' in this embodiment is also fixed to the lever base 33'. It is also to be noted that the indexing slots 147 on the inhibitor plate 43' are inverted relative to those illustrated in FIG. 3 so that they face downwardly toward the pivot axis of the inhibitor plate. In this embodiment, the override actuating pin 48' extends outwardly from a slot 151 in the control lever 28' while being secured to an actuating rod 152 extending axially through the control lever 28'. Also, the control lever 28' is provided with a hand grip 153 having a thumb operated plunger 154 which is secured to the actuating rod 152 and urged upwardly into the position shown in FIG. 8 by a spring 156. The plunger 154 is secured to the actuating rod 152 by means of a set screw indicated at 157. The limit actuating pin 48' tends to be engaged with the indexing slot 147 by the spring 156 while an operator may actuate the override function simply by depressing the plunger 154.

What is claimed is:

1. A manually operable shift control mechanism for selectively establishing one of a multiplicity of speed ratios in a transmission, comprising
    a shift control housing,
    a shift control lever pivotably mounted on said housing for operating the transmission, said lever being angularly movable to a multiplicity of consecutively arranged settings, respectively corresponding to the transmission speed ratios. releasable means tending to engage said shift control lever in each of said multiplicity of settings,
    limit means coupled with said lever, said limit means being operable to limit the number of consecutively arranged settings through which the lever may be angularly moved prior to engagement of said shift control lever by said releasable means,
    override means operatively coupled with said limit means, said override means being selectively operable to override said limit means and permit substantially free angular movement of said lever through said multiplicity of settings, and
    alternate limit means for varying the number of consecutively arranged settings through which the lever may be angularly moved during a selected speed ratio range of operation in the transmission.

2. The shift control mechanism of claim 1 wherein said limit means comprises a movable member resiliently centered relative to said housing and arranged for engagement with said lever when said lever is out of engagement with said releasable means and stop means for limiting motion of said movable member from its resiliently centered position.

3. The shift control mechanism of claim 2 wherein the releasable means comprises a multiplicity of detent means arranged corresponding to respective speed ratio settings with spring means urging the control lever into engagement with one of the detent means.

4. A manually operable shift control mechanism for selectively establishing one of a multiplicity of speed ratios in a transmission, comprising
    a shift control housing,
    a shift control lever pivotably mounted on said housing for operating the transmission, said lever being angularly movable to a multiplicity of consecutively arranged settings respectively corresponding to the transmission speed ratios, releasable means tending to engage said shift control lever in each of said multiplicity of settings, the releasable means comprising a multiplicity of detent means arranged corresponding to respective speed ratio settings with spring means urging the control lever into engagement with one of the detent means,
    limit means coupled with said lever, said limit means being operable to limit the number of consecutively arranged settings through which the lever may be angularly moved prior to engagement of said shift control lever by said releasable means, said limit means comprising a movable member resiliently centered relative to said housing and arranged for engagement with said lever when said lever is out of engagement with said releasable means and stop means for limiting motion of said movable member from its resiliently centered position, and override means operatively coupled with said limit means, said override means being selectively operable to override said limit means and permit substantially free angular movement of said lever through said multiplicity of settings, the detent means and movable limit member are arranged upon opposite sides of a control lever with the control lever necessarily being engaged either with the movable limit member or the detent means, the override means being operable to release the control lever from the movable limit member.

5. A manually operable shift control mechanism for selectively establishing one of a multiplicity of speed ratios in a transmission, comprising a shift control housing, a shift control lever pivotably mounted on said housing, said lever being angularly movable to a multiplicity of consecutively arranged settings respectively corresponding to the transmission speed ratios.

releasable means arranged on said housing and tending to engage said shift control lever in each of said multiplicity of settings, limit means coupled with said lever, said limit means being operable to limit the number of consecutively arranged settings through which the lever is angularly movable prior to engagement of said shift control lever by said releasable means, said limit means comprising a movable member resiliently centered relative to said housing and arranged for engagement with said lever when said lever is out of engagement with said releasable means and stop means for limiting motion of said movable member from its resiliently centered position, and alternate limit means for varying the number of consecutively arranged settings through which the lever may be angularly moved during a selected speed ratio range of operation in the transmission.

6. The shift control mechanism of claim 5 further comprising override means operatively coupled with said limit means, said override means being selectively operable to override said limit means and permit substantially free angular movement of said lever through said multiplicity of settings.

7. The shift control mechanism of claim 5 wherein the releasable means comprises a multiplicity of detent means arranged corresponding to respective speed ratio settings with spring means urging the control lever into engagement with one of the detent means.

8. The shift control mechanism of claim 7 wherein the detent means and movable limit member are arranged upon opposite sides of a control lever with the control lever necessarily being engaged either with the movable limit member or the detent means, the override means being operable to release the control lever from the movable limit member.

* * * * *